UNITED STATES PATENT OFFICE.

WILLIAM F. DOERFLINGER, OF HALESITE, NEW YORK.

PROCESS OF PRODUCING DIACETONE ALCOHOL.

1,066,474.     Specification of Letters Patent.     Patented July 8, 1913.

No Drawing.     Application filed October 10, 1911. Serial No. 653,928.

*To all whom it may concern:*

Be it known that I, WILLIAM F. DOERFLINGER, a citizen of the United States, and a resident of Halesite, in the county of Suffolk and State of New York, have invented certain new and useful Improvements in Processes of Producing Diacetone Alcohol, of which the following is a specification.

Diacetone alcohol is the substance sometimes known as 4-hydroxyl-2-keto-4 methyl pentane. Its formula is believed to be—

$$CH_3.CO.CH_2.C(CH_3)_2OH$$

It is a liquid boiling about 163° C., having a specific gravity of about .93 and is miscible with water, alcohol, ether and acetone. It is a valuable solvent for cellulose acetate, pyroxylin and other substances.

I have found that if acetone is treated with a suitable alkaline condensing agent in the presence of inert organic liquid which is a solvent of the alkaline condensing agent and which is soluble in acetone, diacetone alcohol is formed. As alkaline condensing agent I may use the hydroxid of an alkali metal, alkali alcoholates, etc. I prefer to use the hydroxid of an alkali metal particularly potassium hydroxid. Sodium hydroxid is a useful condensing agent and more rapid in inducing the change but the action is less under control and the tendency to form by products is greater. I prefer to use the alkaline condensing agent in relatively small amounts. As inert organic liquid solvent I may use an aliphatic alcohol and prefer to use methyl alcohol. It need not be present in large proportions. Acetone, condensing agent and solvent should be regulated in such proportion that the liquid if filtered is definitely alkaline in reaction.

The conversion occurs at ordinary atmospheric temperature at which temperature I prefer to operate. I do not restrict myself to such temperature however. The action is more rapid at higher temperatures but is less under control and the tendency to form by products is greater. I allow the reaction to continue until the proportion of diacetone alcohol ceases to increase or increases but slowly. The length of time varies with the specific temperature employed, specific condensing agent and solvent and the proportions. At ordinary temperature it is generally a matter of a number of hours. When the proportion of diacetone alcohol has reached its maximum or a desired degree the mixture which now contains diacetone alcohol, solvent, condensing agent and excess acetone may be separated into its constituents as by fractional vacuum distillation. In general I prefer to remove or destroy the alkaline condensing agent precipitating it with a suitable reagent or neutralizing it with an acid before distilling, although this is not absolutely necessary particularly if a high vacuum be employed in distilling.

For some purposes the mixture of acetone, solvent and diacetone alcohol is useful as such without separation into its constituents. It is generally desirable to remove the condensing agent by precipitation or to destroy it by neutralization.

It will be understood that raw materials consisting of acetone and solvent may be used without further addition of solvent. The alkaline condensing agent in such cases may be directly dissolved in the raw material without further addition of solvent. The product known commercially as methyl acetone which contains acetone and wood alcohol in about equal amounts is such a raw material. I prefer in general to operate in the substantial absence of water, but in most cases the acetone and solvent need not be absolutely anhydrous.

It will be understood that the acetone and solvent recovered from the reaction product are not lost, but can be put back into another batch or be otherwise utilized.

The process is under control, is economical and permits of handling large quantities of acetone in a practical and simple way in a single operation.

The use of an aliphatic alcohol instead of water presents important advantages, the yield of diacetone alcohol is greater, there is less tendency to form undesirable by-products, any aliphatic alcohol left in the product is for most purposes, particularly as a solvent for nitrocellulose, negligible; whereas water, which is held by the diacetone alcohol with considerable tenacity is objectionable in its influence on the solvent properties and has a tendency to cause decomposition of the diacetone alcohol on standing and in distillation.

I will describe as a specific example the production of diacetone alcohol from acetone, using wood alcohol as a solvent and caustic potash as a condensing agent. I take 4600 lbs. of acetone, add 350 lbs. of wood alcohol mix thoroughly and then admix 50 lbs. of wood alcohol containing in solution 6 lbs. of caustic potash. I allow the mixture to stand at atmospheric temperature in a suitable closed vessel for about 48 hours. The specific gravity is now about .82 and the product contains about 20% diacetone alcohol. I then neutralize the caustic potash with acetic acid using a slight excess and distil off the excess of acetone and wood alcohol using a fractionating column and discontinuing the distillation when little more passes over at a temperature of 70° C. The residue of crude diacetone alcohol I purify by vacuum distillation, fractionating if high purity, which is unnecessary for many purposes, is desired.

It will be readily understood that the foregoing description is merely an example and that the manner of operating may be greatly varied without departing from the spirit of my invention.

What I claim is:—

1. The process which consists in treating acetone with an alkaline condensing agent in the presence of an inert organic liquid which is a solvent of the alkaline condensing agent and which is soluble in acetone whereby diacetone alcohol is formed.

2. The process of producing diacetone alcohol which consists in treating acetone with an alkali metal hydroxid in the presence of an inert organic liquid which is a solvent of the alkali metal hydroxid and which is soluble in acetone.

3. The process of producing diacetone alcohol which consists in treating acetone with an alkali metal hydroxid in the presence of an aliphatic alcohol which is a solvent of the alkali metal hydroxid and which is soluble in acetone.

4. The process of producing diacetone alcohol which consists in treating acetone with an alkaline condensing agent in relatively small amount in the presence of an inert organic liquid which is a solvent of the condensing agent and which is soluble in acetone.

5. The process of producing diacetone alcohol which consists in treating acetone with an alkaline condensing agent in the presence of an inert organic liquid which is a solvent of the condensing agent and which is soluble in acetone, at about atmospheric temperature.

6. The process which consists in treating acetone with an alkaline condensing agent in the presence of an inert organic liquid which is a solvent of the condensing agent and which is soluble in acetone, whereby diacetone alcohol is formed and arresting the action while acetone is still present in excess.

7. The process which consists in producing a solution of an alkali metal hydroxid in a mixture of acetone and an aliphatic alcohol, and allowing to stand whereby condensation of the acetone is induced and diacetone alcohol is formed.

8. The process of producing diacetone alcohol which consists in treating acetone in the presence of an inert organic liquid solvent with dissolved alkaline condensing agent, neutralizing the condensing agent while acetone is present in excess, fractionating off the bulk of the excess acetone and purifying by vacuum distillation the diacetone alcohol that is formed.

WILLIAM F. DOERFLINGER.

Witnesses:
Wm. A. Paepke,
Edwin D. Hewitt.